United States Patent [19]
Gaffin et al.

[11] Patent Number: 5,768,421
[45] Date of Patent: Jun. 16, 1998

[54] VISUAL IMAGING SYSTEM AND METHOD

[76] Inventors: Arthur Zay Gaffin, 1514 Canna Ct., Mountain View, Calif. 94043; Brad Smallridge, 1264-8th Ave., San Francisco, Calif. 94122

[21] Appl. No.: 527,047

[22] Filed: Sep. 12, 1995

[51] Int. Cl.[6] .................................................. G06K 9/62
[52] U.S. Cl. ............................................ 382/209; 382/159
[58] Field of Search .................................. 382/190, 195, 382/194, 209, 216, 217, 170, 155, 159, 156, 218

[56] References Cited

U.S. PATENT DOCUMENTS

| 4,014,000 | 3/1977 | Uno et al. | 340/146.3 MA |
|---|---|---|---|
| 4,504,970 | 3/1985 | Werth et al. | 382/14 |
| 4,506,382 | 3/1985 | Hada et al. | 382/27 |
| 4,541,115 | 9/1985 | Werth | 382/14 |
| 5,018,216 | 5/1991 | Kojima | 382/197 |
| 5,111,411 | 5/1992 | Browne | 364/559 |
| 5,619,589 | 4/1997 | Otsu | 382/160 |

OTHER PUBLICATIONS

Johnson, et al., "Implementation of a Variable Cluster Self Organising Algorithm for High Speed Unsupervised Pattern Classification," SPIE, vol. 1197, Automated Inspection & High-Speed Vision Architectures III, pp. 109–116, 1989.
*Archimedes Time Saver*, pp. 2–6, Fall 1991.
Ostman, C., "Smart Object Recognition," *Midnight Engineering*, vol. 5, No. 4, pp. 11, 12, 14, and 17, Jul./Aug. 1994.

*Primary Examiner*—Joseph Mancuso
*Attorney, Agent, or Firm*—Townsend and Townsend and Crew LLP

[57] ABSTRACT

An object recognition apparatus and method for real-time training and recognition/inspection of test objects. To train the system, digital features of an object are captured as sub-frames extracted from a data stream. The data is thresholded and digitized and used to produce an address representing the digital feature. The address is used to write a value into a memory. During recognition or inspection, extracting digital features from a test object, converting the digital features extracted from the test object into addresses, and using the addresses developed from the test object to address the memory to correlate whether the same memory locations are addressed determines whether the test object matches the reference object.

20 Claims, 4 Drawing Sheets

| 1 0 | 2 0 | 3 0 | 4 0 | 5 0 |
|---|---|---|---|---|
| 6 0 | 7 0 | 8 0 | 9 0 | 10 0 |
| 11 1 | 12 1 | 13 1 | 14 0 | 15 0 |
| 16 1 | 17 1 | 18 1 | 19 0 | 20 0 |
| 21 1 | 22 1 | 23 1 | 24 0 | 25 0 |

| SUBFRAME | PIXEL | HASH | BIT | ADDRESS |
|---|---|---|---|---|
| 1 | 0 | XOR | 0 | 1 |
| 2 | 0 | | | |
| 3 | 0 | XOR | 0 | 2 |
| 4 | 0 | | | |
| 5 | 0 | XOR | 0 | 3 |
| 6 | 0 | | | |
| 7 | 0 | XOR | 0 | 4 |
| 8 | 0 | | | |
| 9 | 0 | INV | 1 | 5 |
| 10 | 0 | INV | 1 | 6 |
| 11 | 1 | INV | 0 | 7 |
| 12 | 1 | INV | 0 | 8 |
| 13 | 1 | INV | 0 | 9 |
| 14 | 0 | INV | 1 | 10 |
| 15 | 0 | INV | 1 | 11 |
| 16 | 1 | INV | 0 | 12 |
| 17 | 1 | XOR | 0 | 13 |
| 18 | 1 | | | |
| 19 | 0 | XOR | 0 | 14 |
| 20 | 0 | | | |
| 21 | 1 | INV | 0 | 15 |
| 22 | 1 | INV | 0 | 16 |
| 23 | 1 | INV | 0 | 17 |
| 24 | 0 | INV | 1 | 18 |
| 25 | 0 | INV | 1 | 19 |

VISUAL IMAGING SYSTEM AND METHOD

BACKGROUND OF THE INVENTION

The present invention relates to automatic object recognition by use of a machine, and more particularly to real time object recognition and inspection through extraction of digital features from an object under analysis.

In the prior art, it is known to use pattern recognition to attempt to match an image of an object to each of a plurality of stored images to determine the type of object under analysis. Such prior art systems typically fail to adequately recognize an object under analysis when the object has an orientation (translational, or rotational) different from the standard object, or the object includes features or variations that are not part of the standard object.

Transforming and transmitting electronic images has been accomplished for many years. A field of endeavor known as artificial intelligence has been applied to processing of electronic images to recognize, classify, or identify complex objects. Unfortunately, the artificial intelligence is limited and application of the technology has been problematic, particularly when visual images to be considered are blurred, partially obscured, or not entirely geometric, or the visual image includes a background that is confusing or noisy.

In the prior art, it is known to use a programming approach wherein a set of software tools are applied to the visual image (e.g., edge enhancers, movement detectors, Fourier transforms, etc.) to help discern the objects. Such systems usually require the objects to be fairly "clean" in order for the applied software tools to produce acceptable results. This processing is not performed in real time.

Another solution has been development and application of neural networks wherein the complex objects to be recognized are learned through use of a training process. Subsequent exposure of the complex object, or another object matching the complex object, to the recognition system results in identification of the complex object. Neural networks, for better or worse, are able to learn differences and nuances of a reference object that a programmer may not have anticipated.

SUMMARY OF THE INVENTION

The present invention provides for a method and apparatus for reliably identifying an input object and comparing the input object against a representation of a standard object to determine whether the input object matches the standard object. Use of the present invention permits development of a recognition system that is faster per unit cost than present designs of neural network systems. Additionally, the present invention offers similar advantages to the neural network approach, specifically object training and learning without use of programming tools.

The method and apparatus of the preferred embodiment provides for a real time object recognition system that is robust and flexible in its ability to learn a reference object and to thereafter discriminate the object against unfavorable objects or backgrounds. The system is able to properly identify input objects having orientational, positional, or enhancements and modifications that differ from the parameters of the reference object when the learning occurred.

According to one aspect of the present invention, a preferred embodiment includes a method for recognizing an object. The method includes the steps of forming a first digital characterization of the object by capturing a first plurality of digital features from the object; storing the first digital characterization of the object into a memory by writing, responsive to each one the digital features of the first plurality of digital features, a first preselected value into an address location of the memory that is determined from the one digital feature; forming a second digital characterization of a second object by capturing a second plurality of digital features from the second object; and comparing the second digital characterization to the first digital characterization by reading, for each one digital feature of the second plurality of features, a second plurality of address locations of the memory that are determined from the second plurality of digital features to determine a number of the second plurality of address locations that have the first preselected value; and recognizing the second object as the object when the number exceeds a threshold value.

According to the preferred embodiment, video information from a television camera is thresholded to produce a stream of binary data. The stream is saved and moved into a series of shift registers in order to extract sub-frames from it (e.g., a sub-frame may include a five pixel by five pixel region of the binary stream). The sub-frames represent a small moving region of interest extracted from the binary data stream. Binary information from each sub-frame is used (directly or after hashing) to address a large random access memory.

As the sub-frames are continuously generated from the video stream, the memory is also continuously addressed. Depending upon a particular mode of the object recognition system, different operations are occurring with respect to the accessing of the memory. The modes of operation include a learn mode, an ignore mode, a recognize mode, and an inspect mode.

In learn mode, a desirable reference object is placed in the field-of-view of the camera, and a binary "1" is written into the memory at those addresses corresponding to the addresses generated from the sub-frames. In ignore mode, an undesirable reference object is placed in the field-of-view and a binary "0" is written to the memory at addresses generated from sub-frames processed while in ignore mode. In recognize mode, an object under analysis is placed in the field-of-view and addresses generated from the sub-frames are used to read the memory. If the value stored is a binary "1" then a counter is incremented.

If the counter exceeds a preselected decision threshold limit in a prespecified period (typically after the sub-frames of the object under analysis have all been processed at least once), a signal indicating a match is generated. Otherwise, a no match condition is indicated.

In inspect mode, the system is trained using a non-defective part in learn mode. During inspect mode, parts to be inspected are processed and the memory is read using addresses generated from the inspected parts similar to the recognize mode. A binary "0" read from memory during inspect mode, indicates a variation from the standard reference object. For each part, if the count of binary "0's" exceeds a decision criterion, then the part fails inspection and is identified as a non-conforming part.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 1:
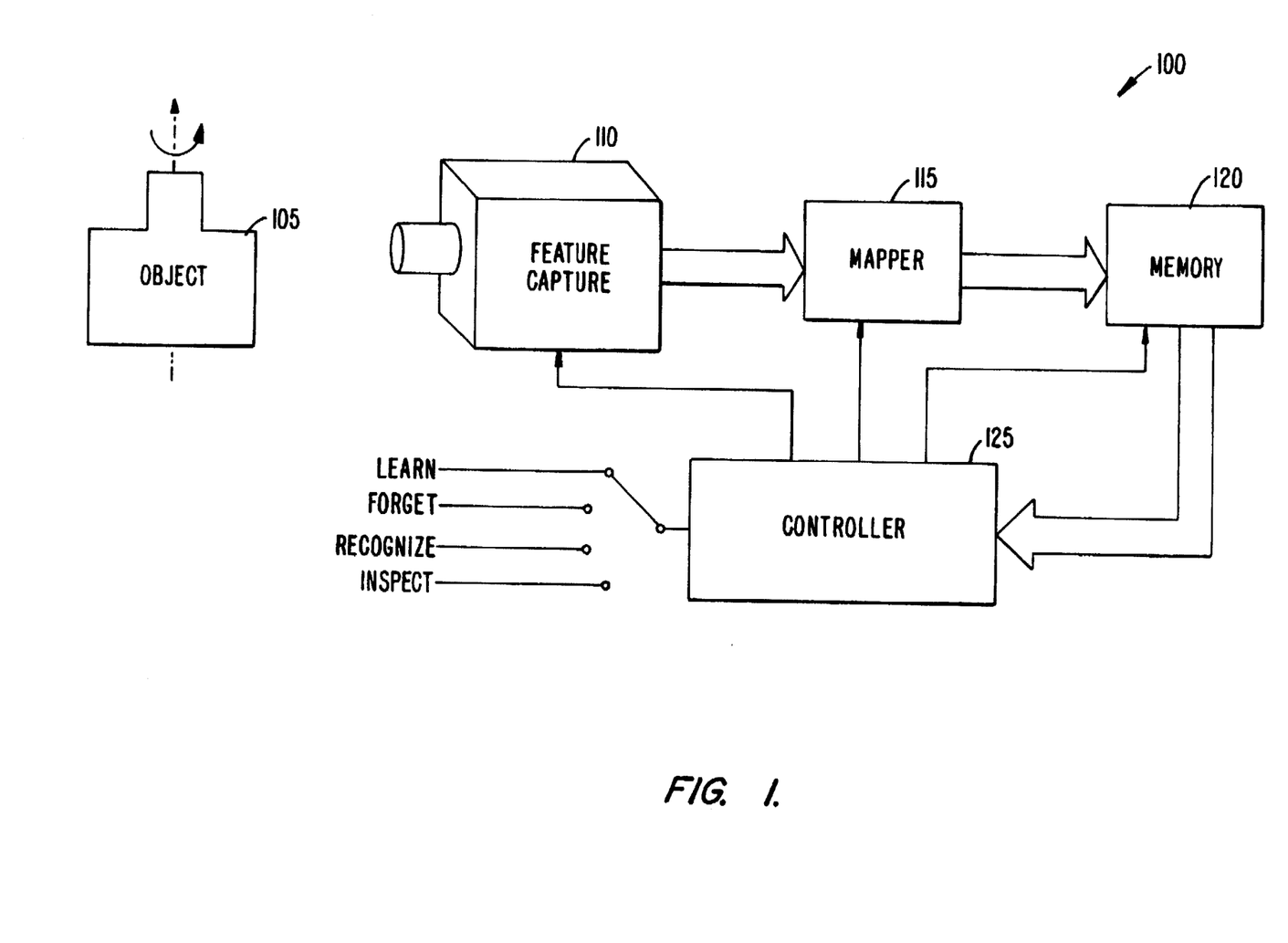
FIG. 1 is a block schematic diagram of a preferred embodiment of the present invention for a visual imaging system.

FIG. 1 is a block schematic diagram of a preferred embodiment of the present invention for a visual imaging system 100. Visual imaging system 100 processes images from an object 105 as explained in detail below with respect to FIG. 2. System 100 includes a feature capturing apparatus 110, a memory mapper 115, a memory 120, and a controller 125.

In the preferred embodiment, feature capture apparatus 110 receives an image of object 105 and extracts a plurality digital features from the image. Feature capture apparatus 110 scans the image in a predetermined, and repeatable, pattern to establish the plurality of digital features. Each digital feature from feature capture apparatus 110 is provided to mapper 115. Mapper 115 translates the digital features into memory addresses used to store a value into memory 120. The particular translation mechanism as well as the particular value stored into memory 120 are dependent upon an operational mode and embodiment of imaging system 100.

In a simple preferred embodiment, feature capture apparatus 110 represents each digital feature as a twenty-five bit feature word. Mapper 115 uses the feature word as a feature address to access memory 120. In another embodiment, mapper 115 hashes the bits of the feature word into a smaller address space. By selectively exclusive-ORing selected bits together, mapper 115 reduces the active address space. For example, by exclusive-ORing six pairs of bits, a nineteen bit feature address may be formed from the twenty-five bit feature word. One preferred embodiment of the present invention uses a nineteen bit address space for memory 120.

In the simple preferred embodiment, mapper 115 uses the feature address to access memory 120, both for reading and writing, depending upon the operational mode. Controller 125, coupled to feature capture apparatus 110, mapper 115, and memory 120 controls the operational modes of the other components. In the preferred embodiment, there are four operational modes: a LEARN mode, a IGNORE mode, a RECOGNIZE mode, and an INSPECT mode.

In a typical implementation, a reference object is used as object 105 and controller 125 puts imaging system 100 into LEARN mode. Object 105 continuously rotates in the preferred embodiment, though other embodiments may have object 105 remain stationary or move along a straight path, or some other pattern. In LEARN mode, feature capture apparatus 110 continuously images object 105 to extract a series of digital features as described above. Each digital feature of the series of digital features is provided to mapper 115 and converted to a series of feature addresses. Controller 125 writes a binary "1" into memory 120 at each feature address generated while in LEARN mode. Mapper 115 provides an address, and controller 125 writes the appropriate data.

Depending upon the particular implementation, imaging system 100 remains in the LEARN mode for various amounts of time. Typically, imaging system 100 stays in the LEARN mode until an entire image of object 105 is fully-processed with digital features extracted and used to record values in memory 120.

After imaging system 100 has learned reference object 105, a second object 105 is placed in the field-of-view of feature capture apparatus 110. Second object 105 may be another reference object to be used to write binary "1" values into memory 120. Second object 105 may also be a special type of reference object that is used in IGNORE mode. In IGNORE mode, imaging system 100 operates similarly to its operation in LEARN mode, except binary "0" values are written into memory 120 using generated feature addresses. The process of exposing imaging system 100 to reference objects 105 (or to sets of objects) while in either the LEARN mode or the IGNORE mode is referred to as training.

After imaging system 100 is trained, controller 125 initiates system 100 into RECOGNIZE mode. Thereafter, an object 105 to be recognized is exposed to imaging system 105. Feature capture apparatus 110 extracts digital features from object 105 as described earlier, and mapper 115 generates feature addresses from the digital features, also as earlier described. However, in RECOGNIZE mode, controller 125 uses each of the feature addresses to read memory 120. Each binary "1" is counted and accumulated to produce a total count. If the total count exceeds a predetermined threshold, then controller 125 determines that object 105 under test matches the reference object used to train imaging system 100. Again, various embodiments will expose object 105 under test to imaging system 100 in RECOGNIZE mode for differing amounts of time. Typically, an entire image of object 105 is processed before controller 125 determines a no match condition.

The INSPECT mode is a variation of the various modes described above. To train imaging system 100 in preparation of the INSPECT mode, imaging system is put into LEARN mode with an exemplar object placed in the field-of-view of feature capture apparatus 110. Once the exemplar object is learned, imaging system 100 is trained. Controller 125 puts system 100 into the INSPECT mode. During inspect mode, objects to be tested for defects (i.e., variations from the exemplar object) are exposed to imaging system 100. During the INSPECT mode, a total count of binary "0" values are accumulated into a defect count. If the defect count exceeds a predetermined threshold, controller 125 indicates that the object varies from the exemplar object and may be defective.

Figure 2:
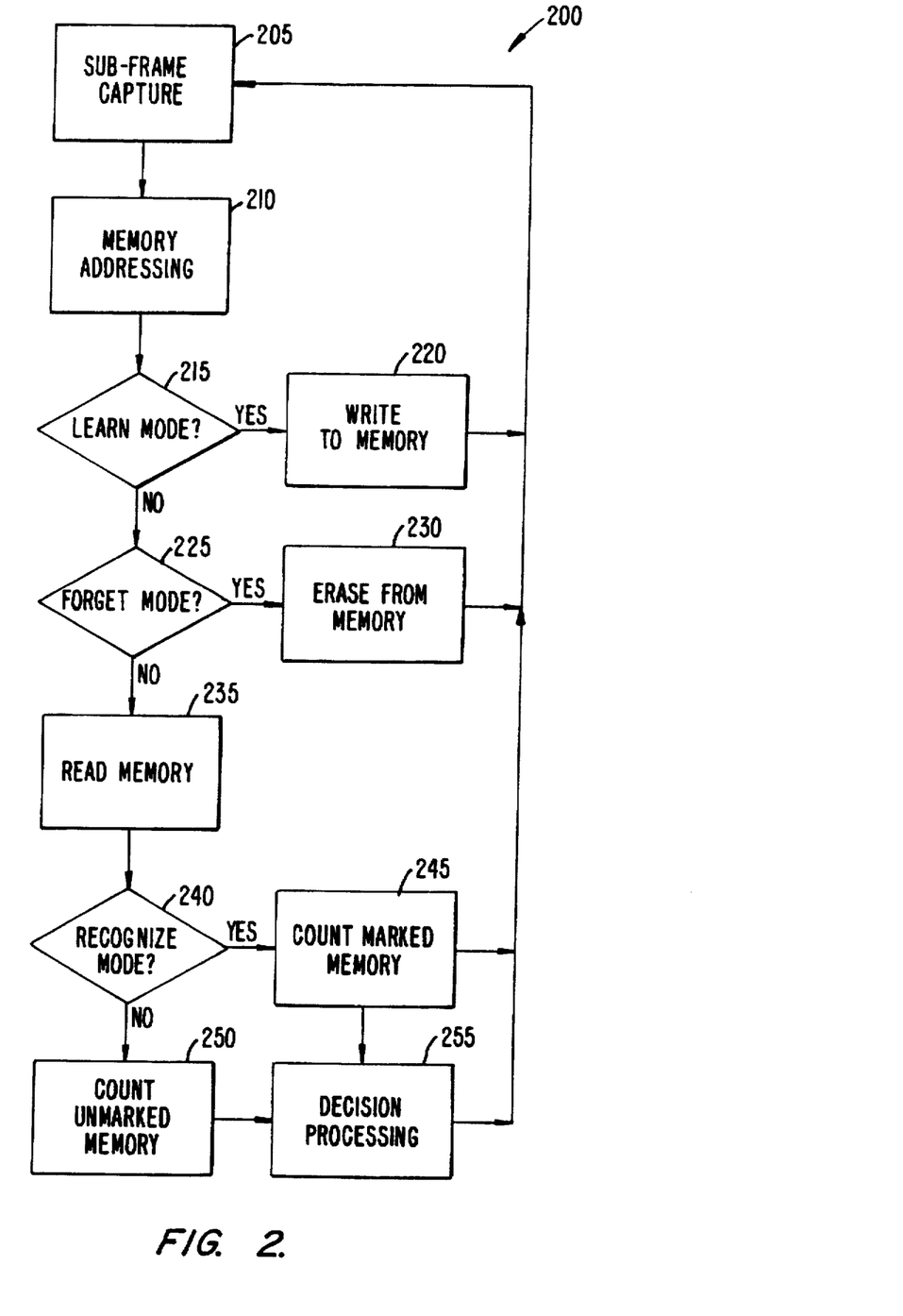
FIG. 2 is a flowchart identifying preferred steps of a visual imaging method according to the preferred embodiment.
Figure 3:
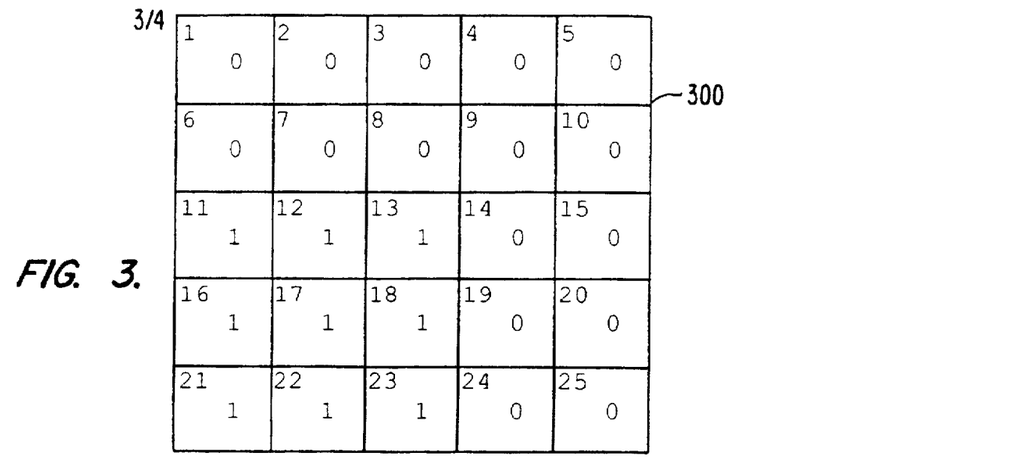
FIG. 3 is a representative diagram of a sub-frame according to a preferred embodiment of the present invention.

FIG. 2 is a flowchart identifying preferred steps of a visual imaging method 200 according to the preferred embodiment. Visual imaging method 200 includes steps 205–255 implemented on visual imaging system 100 shown in FIG. 1. At step 205, a sub-frame capture step, a small region of interest is captured from a larger image of object 105. FIG. 3 is a representative diagram of a sub-frame 300 according to a preferred embodiment of the present invention. As well known, a typical image from an imaging apparatus, such as those used in feature capture apparatus 110 shown in FIG. 1, includes a plurality of rows of scan information. It is well-known to threshold and digitize these rows of scan information to form a binary matrix of pixel values of the entire image and write the image data into a frame buffer.

The sub-frame capture step 205 shown in FIG. 2 takes a portion of the frame buffer and uses it as sub-frame 300 shown in FIG. 3. Sub-frame 300 is a 5×5 pixel array. In sub-frame 300, a pixel having a "1" represents a pixel derived from an analog value less than a first preset threshold and a pixel having a "0" value represents a pixel derived from an analog value greater than a second preset threshold. In some embodiments, the first and second threshold values are equal, but not necessarily so. When the threshold values are different, an analog value between the threshold values represents an invalid pixel. Any sub-frame having an invalid pixel is ignored in subsequent processing.

Figure 4:
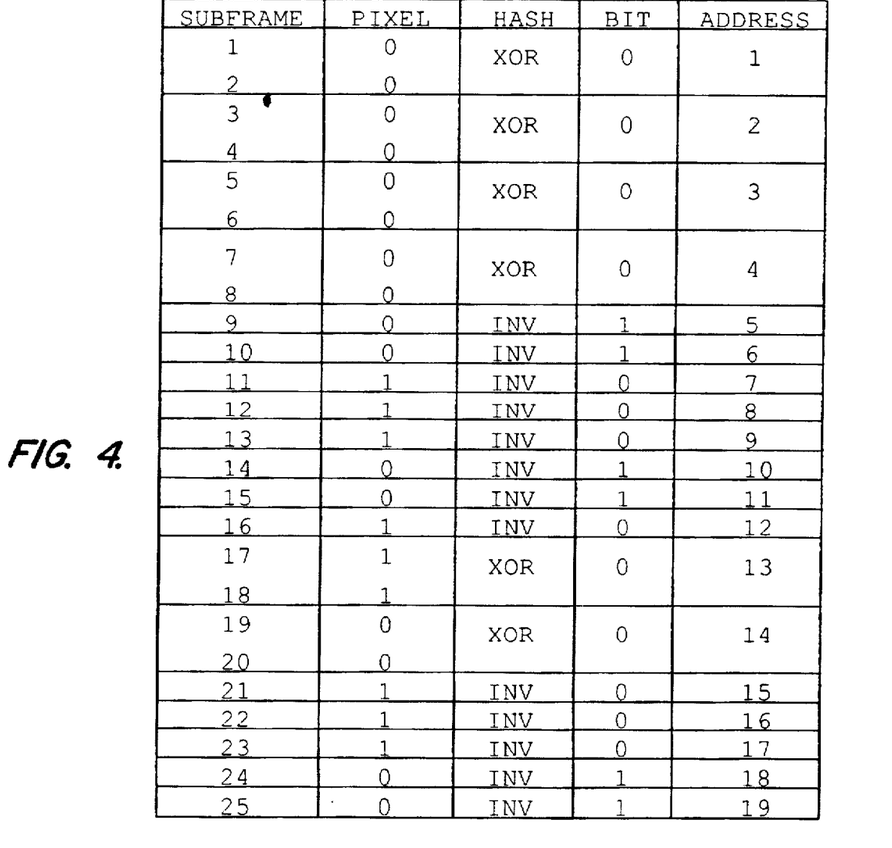
FIG. 4 is a diagram representing hashing of pixels of FIG. 3 into a feature address.

To simplify the following description, each of the twenty-five sub-matrix cells of sub-frame 300 has a label in the range 1–25. The bit values of the cells are used to form the feature address. FIG. 4 is a diagram representing hashing of pixels of FIG. 3 into a feature address. For example, the bit values of the pixels of cells labeled 1 and 2 are EXCLUSIVE-ORed together to form a single bit of the feature address. Similarly, pixels of cells 3 and 4, cells 5 and 6, cells 7 and 8, cells 17 and 18, and cells 19 and 20 are EXCLUSIVE-ORed to form bits of the feature address as shown in detail in FIG. 4. Pixel values of the other cells are inverted to form the remainder of the feature address values. This mapping of the twenty-five pixel values in sub-frame 300 shown in FIG. 3 into the nineteen bit feature address is referred to as hashing in this description. Hashing is well-known in the art and is used to reduce the active address space of memory 120 shown in FIG. 1. Note that for some embodiments, a different hashing process may result in better performance or better distribution of values in memory 120. Also, some embodiments may dispense with hashing altogether. The EXCLUSIVE-OR hashing procedure was implemented because of its speed and simplicity, though it may not be a theoretical ideal hash in distributing evenly the addresses throughout the actual physical address space.

After sub-frame capture step 205 shown in FIG. 2, imaging system 100 performs a memory addressing step 210. Memory addressing step 210 processes sub-frame 300 to form the feature address as described earlier. The feature address is used to access memory 120 shown in FIG. 1. After accessing a storage location of the memory, imaging system 100 checks, at step 215, whether controller 125 has commanded LEARN mode. If it has, system 100 branches to step 220 to write a binary "1" at the feature address location of the memory. Thereafter, system 100 returns to step 205 to process a new sub-frame 205.

However, if at step 215, system 100 determines that controller 125 has not commanded LEARN mode, system 100 advances to step 225. At step 225, system 100 determines whether controller 125 has commanded the IGNORE mode. If system 100 is in IGNORE mode, system 100 advances to step 230 from step 225. At step 230, system 100 writes a binary "0" at the feature address storage location of memory 120. Thereafter, system 100 returns to step 205 to process a new sub-frame 300. Steps 220 and 230 collectively define the training steps of the preferred embodiment.

If at step 225, system 100 is not in IGNORE mode, then system 100 advances to step 235. At step 235, system 100 reads the storage location referenced by the feature address. After reading the memory at step 235, system 100 tests to determine if it is in RECOGNIZE mode. If system 100 is in RECOGNIZE mode, system 100 advances to step 245. At step 245, system 100 counts marked memory. That is, an accumulator is incremented if the value of the storage location accessed using the feature address matches a predetermined value. In the preferred embodiment, the predetermined value is a binary "1" to indicate a match. However, in the preferred embodiment of the present invention, if the test at step 240 is that system 100 is not in RECOGNIZE mode, then system 100 is in INSPECT mode and advances to step 250. At step 250, system 100 counts unmarked memory. Unmarked memory are binary "0" values, which in the preferred embodiment, indicate a mismatch to a known good and previously learned object. As the number of mismatches increases, the likelihood of a defective part increases.

After both step 245 and step 250, system 100 performs a decision processing step. The processing is dependent upon the particular mode and implementation. In the preferred embodiment, the decision processing results in an indication of a match condition if, after step 245, the accumulator value exceeds a first predetermined threshold. Similarly, a variance indication is made if, after step 250, the accumulator value exceeds a second predetermined threshold. The first and second thresholds may be different, or represent the same value, depending upon a particular implementation.

After step 255, system 100 returns to step 205 to process a new sub-frame. In the preferred embodiment, system 100 continuously cycles through steps 205–255 to process every sub-frame of an object's image at least once.

Alternate Preferred Embodiments

The description above depicts a representative simple embodiment that performs basic real time recognition and inspection functions after a training process that does not require software programming. The preferred embodiment may be enhanced in many ways.

One enhancement provides for hierarchy levels in which multiple training levels are daisy-chained together. In such a hierarchy system, a first level of training writes and removes one or more digital features with respect to a first memory as described above. Thereafter, a second mapping process operates on the memory image to extract a second level of digital features from the first memory. These second level digital features are used to generate a second set of feature addresses to access storage locations of a second memory. Recognition and inspection decisions would then be made from the second memory. As the reader will appreciate, even more hierarchy levels may be added in series to produce higher-order systems.

Another enhancement to the preferred embodiment is to associate a count with each storage location of the memory. The count represents the number of times that the storage location has been written to. One use of the count value is to weight a significance of certain digital features. One use of the count value is for system 100 to use a background process that periodically cycles through each count value and compares the value against a threshold value. If the count value exceeds the threshold, no change is made, or a flag may be set indicating that the storage location is locked. A locked storage location may not be changed until the memory is reset. For any count value less than the threshold, the background process clears the storage value and resets the count value. A particular value of the threshold value is dependent upon a specific implementation.

The background process may implemented as the orderly process previously described that cycles through the entire memory upon expiration of a timer, or alternatively, the process may randomly read one or more count values associated with memory locations upon expiration of a timer, or other initiating system.

Still another enhancement to the preferred embodiment relates to the value written into a memory location during LEARN mode. Rather than a simple bit being written, a 'signature' word may be written into a memory location using a signature address. In one implementation of this version of system 100, a digital feature is converted to a feature address as described earlier. A portion of the feature address is used as the signature with the remainder of the feature address used as the signature address. The signature is written into the memory using the signature address. Training, recognizing and inspection are implemented as described earlier.

The signature system may be further enhanced by providing the count value associated with each stored signature. Each time a signature is written using a signature address, any previously stored signature value is compared to the signature value that is about to be stored. If the signature values match, the associated count value is incremented. However, if the signature values are different, the count value is examined. If the count value is less than a signature lock value, the new signature value is written in place of the old signature value and the count value is reset to 1. If the count value is greater than the signature lock value, the new signature value is ignored.

The count value may also be used in the FORGET mode, in that an incoming signature value to a particular address is compared to the stored value. If there is a match for the signature value and the system is in FORGET mode, the counter may be decremented. The locking feature may also be implemented to disable changes to the count values.

Different embodiments may treat the count values differently. In some applications, a low count may be indicative of background noise and not indicate any significant digital feature. Similarly, in some applications having a count value that exceeds a HIGH COUNT value, the count value may be indicating a common digital feature or background feature that should not be used to discriminate or to use in the decision processing step. Thus, some applications may only use count values falling within a DISCRIMINATION range. The upper and lower limits of the DISCRIMINATION range may have to be set by empirical trials, or with a calibration program established for the specific application.

For the alternate embodiments described above having a count value associated with particular memory locations, it is possible to provide for a system having a variable response to certain digital features. That is, for some systems, the controller may determine that a certain digital feature is more significant than an average digital feature. In these cases, count values associated with significant digital features are incremented more than the 'average' value. For some very significant digital features, the count value may be incremented substantially and the particular memory location locked by receipt of a single digital feature mapped to the particular memory location.

Another way to provide weighting is to use a temporal component. In certain applications, sets of digital features that are detected close in time to each other may be more 'significant' than if those same digital features are more distant, in the temporal sense. A time stamp may be associated with a memory location or with a signature value. In one preferred embodiment, should another access to the same memory location or to the same location with the same signature value occur within a predetermined interval, the value for incrementing (if in learn mode) or for decrementing (if in ignore mode) may be increased depending upon how close in time the events occur. In some applications, sets of memory locations may be related and the relationship may be able to be measured by temporal intervals between accesses.

Another alternate embodiment relates to the feature capture apparatus. In the preferred embodiment described above with respect to FIG. 1–FIG. 4, the sub-frame capture process is implemented to move a 5×5 region from left to right, top to bottom through a frame buffer. In some implementations, it may be better to provide a scanning pattern that is more irregular. Virtually any scanning pattern may be used, such as spirals, periodic functions or discontinuous patterns, for example. In the preferred embodiment, the limitation on the scanning pattern is that it be repeatable and consistent through each pass through the values of the frame buffer during recognition or inspection, just as scanning was during training.

Figure 5:
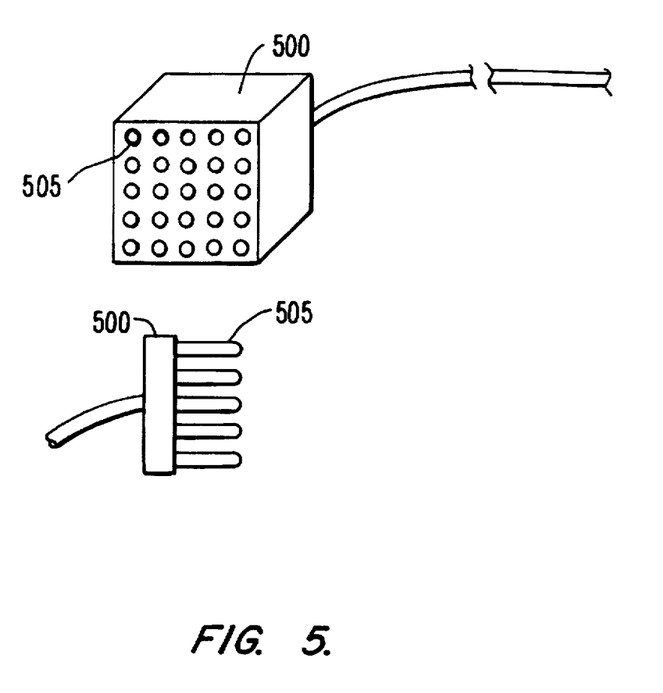
FIG. 5 is a diagram of an alternate preferred embodiment of a feature capture apparatus.

FIG. 5 is a diagram of an alternate preferred embodiment of a feature capture apparatus 500. Apparatus 500 is a matrix of light-detecting-diodes 505 that is used to directly capture sub-frame 300 rather than extracting the sub-frame from an data stream using a series of shift registers, as well known in the art. Apparatus 500 is mechanically moved over an object, preferably in a repeatable pattern. In some embodiments, incorporation of apparatus 500 in a hand wand and waving the wand over an object achieves satisfactory results. Various patterns of light-deleting-diodes may be used instead of the 5×5 matrix shown in FIG. 5. Any regular, or irregular, array or pattern may be implemented.

In conclusion, the present invention provides a simple, efficient solution to a problem of real-time recognition and inspection without elaborate programming required to train the system. While the above is a complete description of the preferred embodiments of the invention, various alternatives, modifications, and equivalents may be used. Therefore, the above description should not be taken as limiting the scope of the invention which is defined by the appended claims.

What is claimed is:

1. A method for recognizing an object, comprising the steps of:

forming a first digital characterization of the object by capturing a first plurality of digital features from the object; thereafter storing said first digital characterization of the object into a memory by writing, responsive to each one said digital features of said first plurality of digital features, a first preselected value into an address location of said memory that is determined from said one digital feature; thereafter forming a second digital characterization of a second object by capturing a second plurality of digital features from said second object; and thereafter comparing said second digital characterization to said first digital characterization by reading, for each one digital feature of said second plurality of features, a second plurality of address locations of said memory that are determined from said second plurality of digital features to determine a number of said second plurality of address locations that have said first preselected value; and thereafter recognizing said second object as the object when said number exceeds a threshold value.

2. The recognizing method of claim 1 wherein said first digital characterization forming step comprises the steps of:
converting an image of the object into a binary image; and
sampling periodically, according to a predetermined pattern, selected ones of a plurality of bits making up said binary image to form said first plurality of digital features.

3. The recognizing method of claim 2 wherein said binary image is an array and wherein said sampling step comprises extracting a plurality of tiles of said binary image, each tile being m x n bits, with m and n being positive integers.

4. The recognizing method of claim 3 wherein said storing step further comprises the steps of:

converting said m x n bits of a particular tile into an address for said address location of said particular tile.

5. The recognizing method of claim 4 wherein said converting step produces said address having a number of bit positions equal to a product of m and n.

6. The recognizing method of claim 4 wherein said converting step further comprises the step of:

hashing said address to form said address having a number of bit positions less than a product of m and n.

7. The recognizing method of claim 1 further comprising the steps of:

forming, after said second digital characterization forming step and prior to said comparing step, a third digital characterization of a third object by capturing a third plurality of digital features from said third object; and thereafter removing, prior to said comparing step, said third plurality of digital features from said memory, responsive to each one of said third plurality of digital features, by writing a second preselected value into an address location of said memory that is determined from said one third digital feature.

8. The recognizing method of claim 1 wherein said digital characterization forming steps further comprise the steps of:

capturing an analog video image; thereafter sampling periodically said analog video image to produce a series of sampled image blocks; and thereafter thresholding said series of sampled image blocks to form a series binary image pixels, each particular one said binary image pixel having a first predetermined value when a particular one sampled image block thresholded to form said particular one binary image exceeds a first threshold value, otherwise said particular one binary image pixel having a second predetermined value.

9. The recognizing method of claim 1 wherein said digital characterization forming steps further comprise the steps of:

capturing an analog video image; thereafter sampling periodically said analog video image to produce a series of sampled image blocks each block having an amplitude; and thereafter thresholding said series of sampled image blocks to form a series binary image pixels, each particular one said binary image pixel having a first predetermined value when a particular one sampled image block thresholded to form said particular one binary image has an amplitude that exceeds a first threshold value, said particular one binary image pixel having a second predetermined value when said particular one sampled image block thresholded to form said particular one binary image has an amplitude that is less than a second threshold value.

10. The recognizing method of claim 9 wherein said first threshold value and said second threshold value are equal.

11. The recognizing method of claim 9 wherein each said binary image pixel has an associated validity bit.

12. The recognizing method of claim 11 wherein an associated validity bit is set to a validity value indicating an invalid pixel when said associated binary image pixel is formed from a sampled image block having an amplitude that is less than said first threshold value and greater than said second threshold.

13. The recognizing method of claim 1 wherein each address location of said memory has an associated counter, said first digital characterization storing step further comprising:

incrementing, for each address location, said counter associated with said address location each time said first preselected value is written to said address location.

14. The recognizing method of claim 13 further comprising the steps of:

incrementing a count value associated with each counter each time said first preselected value is written into said address location associated with said counter.

15. The recognizing method of claim 14 further comprising the steps of:

reading periodically each count value of each counter associated with an address location; thereafter comparing each count value to a commit value; thereafter resetting said count value of each said counter associated with each particular address location when said count value is less than said commit value; and thereafter clearing said first predetermined value from each said particular address location associated with each counter that is reset.

16. A method for recognizing an object, comprising the steps of:

forming a first digital characterization of the object by capturing a first plurality of digital features from the object; thereafter storing said first digital characterization of the object into a memory by writing, responsive to each one said digital features of said first plurality of digital features, a first preselected value into an address location of said memory that is determined from said one digital feature; thereafter forming a second digital characterization of the object by capturing a second plurality of digital features from said memory; thereafter storing said second digital characterization of the object into a second memory by writing, responsive to each one said digital features of said second plurality of digital features, said first preselected value into an address location of said second memory that is determined from said one digital feature of said second plurality of digital features; thereafter forming a third digital characterization of a second object by capturing a third plurality of digital features from said second object; and thereafter forming a fourth digital characterization of said second object by capturing a fourth plurality of digital features from said third digital characterization; and thereafter comparing said fourth digital characterization to said second digital characterization by reading, for each one digital feature of said fourth plurality of features, a second plurality of address locations of said second memory that are determined from said fourth plurality of digital features to determine a number of said second plurality of address locations that have said first preselected value; and thereafter recognizing said second object as the object when said number exceeds a threshold value.

17. A method for recognizing an object, comprising the steps of:

forming a first digital characterization of the object by capturing a first plurality of digital features from the object; thereafter storing said first digital characterization of the object into a memory by writing, responsive to each one said digital features of said first plurality of digital features, a signature value into an address location of said memory that is determined from said one digital feature; thereafter forming a second digital characterization of a second object by capturing a second plurality of digital features from said second object; and thereafter comparing said second digital characterization to said first digital characterization by reading, for each one digital feature of said second plurality of features, a second plurality of address locations of said memory that are determined from said second plurality of digital features to determine a number of said second plurality of address locations that have a corresponding matching signature value; and thereafter recognizing said second object as the object when said number exceeds a threshold value.

18. The recognizing method of claim 17 wherein each address location of said memory has an associated counter, said first digital characterization storing step further comprising:

reading said address location prior to writing said signature value to obtain a read signature value; thereafter comparing said read signature value to said signature value prior to writing said signature value; and thereafter incrementing, for each address location, said counter associated with said address location each time a matching signature value is written to said address location.

19. The recognizing method of claim 18 further comprising the steps of:

clearing, after said comparing step, said counter when said signature value does not match said read signature value; and writing, after said comparing step, said non matching signature value into said memory.

20. The recognizing method of claim 19 further comprising the step of:

reading, prior to said counter clearing step and prior to said signature value writing step, a count value stored in said counter associated with said address location; and thereafter inhibiting said counter clearing step and said nonmatching signature writing step when said count value exceeds a commit value.

* * * * *